(12) United States Patent
De Cesari et al.

(10) Patent No.: US 12,508,859 B2
(45) Date of Patent: Dec. 30, 2025

(54) INDEPENDENT SUSPENSION

(71) Applicant: BRIST AXLE SYSTEMS S.R.L., Montichiari (IT)

(72) Inventors: Filippo De Cesari, Mazzano (IT); Danilo Bonera, Collebeato (IT); Ahmet Haciyunus, Uskudar Istanbul (TR)

(73) Assignee: BRIST AXLE SYSTEMS S.R.L., Montichiari (IT)

( * ) Notice: Subject to any disclaimer, the term of this patent is extended or adjusted under 35 U.S.C. 154(b) by 0 days.

(21) Appl. No.: 18/424,027

(22) Filed: Jan. 26, 2024

(65) Prior Publication Data
US 2024/0270038 A1     Aug. 15, 2024

(30) Foreign Application Priority Data

Feb. 15, 2023   (IT) .......................... 102023000002526

(51) Int. Cl.
| | | |
|---|---|---|
| *B60G 3/01* | (2006.01) | |
| *B60G 15/00* | (2006.01) | |
| *B60K 7/00* | (2006.01) | |
| *B60K 17/04* | (2006.01) | |

(52) U.S. Cl.
CPC .............. *B60G 3/01* (2013.01); *B60G 15/00* (2013.01); *B60K 7/0007* (2013.01); *B60K 17/043* (2013.01)

(58) Field of Classification Search
CPC ........ B60G 3/01; B60G 15/00; B60K 7/0007; B60K 17/043
See application file for complete search history.

(56) References Cited

U.S. PATENT DOCUMENTS

| | | | | | |
|---|---|---|---|---|---|
| 1,481,405 | A | * | 1/1924 | Anglada ................. | B60L 50/52 180/57 |
| 2,589,863 | A | * | 3/1952 | Quartullo ............... | B60G 11/52 180/65.245 |
| 5,343,974 | A | * | 9/1994 | Rabek .................. | B60K 7/0007 180/170 |

(Continued)

FOREIGN PATENT DOCUMENTS

| | | | |
|---|---|---|---|
| CN | 209870094 U | * | 12/2019 |
| DE | 102017116733 A1 | | 1/2019 |

(Continued)

OTHER PUBLICATIONS

Machine translation of CN-209870094-U, obtained Aug. 2024 (Year: 2024).*

(Continued)

*Primary Examiner* — Minnah L Seoh
(74) *Attorney, Agent, or Firm* — SHUTTLEWORTH & INGERSOLL, PLC; Timothy J. Klima

(57) ABSTRACT

An independent suspension for vehicles, in particular for transporting people and/or materials, including a hub defining a rotation axis of the wheel of the vehicle, an electric motor, operatively connected to the hub and configured to rotate the hub and a support element operatively connected to the hub and developing, with a planar shape, along its own main development direction transverse to the rotation axis of the wheel. The support element is arranged below the hub and the electric motor. The electric motor develops within a containment volume defined at least partially by the support element.

18 Claims, 6 Drawing Sheets

(56) References Cited

U.S. PATENT DOCUMENTS

| | | | |
|---|---|---|---|
| 7,083,015 B2* | 8/2006 | Ruppert | B60K 17/22 |
| | | | 180/65.6 |
| 7,651,153 B2* | 1/2010 | Martin | B60G 17/017 |
| | | | 180/65.6 |
| 9,108,496 B2* | 8/2015 | Yamamoto | B60G 3/20 |
| 2001/0011611 A1* | 8/2001 | Poerschmann | B60K 1/02 |
| | | | 180/65.1 |
| 2003/0010561 A1* | 1/2003 | Bartel | B62D 21/02 |
| | | | 180/292 |
| 2004/0124019 A1 | 7/2004 | Harrup | |
| 2008/0179116 A1* | 7/2008 | Ikenoya | B60K 17/356 |
| | | | 180/63 |
| 2013/0228994 A1* | 9/2013 | Davy | B60G 3/185 |
| | | | 280/124.128 |
| 2014/0284121 A1* | 9/2014 | Baek | B60G 7/001 |
| | | | 180/62 |

FOREIGN PATENT DOCUMENTS

| | | |
|---|---|---|
| EP | 1785288 A1 | 5/2007 |
| EP | 3785949 A1 | 3/2021 |
| EP | 3888956 A1 | 10/2021 |
| IT | 202000004966 A1 | 9/2021 |
| JP | 2005289252 A | 10/2005 |
| WO | 2008027159 A2 | 3/2008 |

OTHER PUBLICATIONS

Italian Search Report dated Aug. 17, 2023 from counterpart Italian App No. IT 202300002526.

* cited by examiner

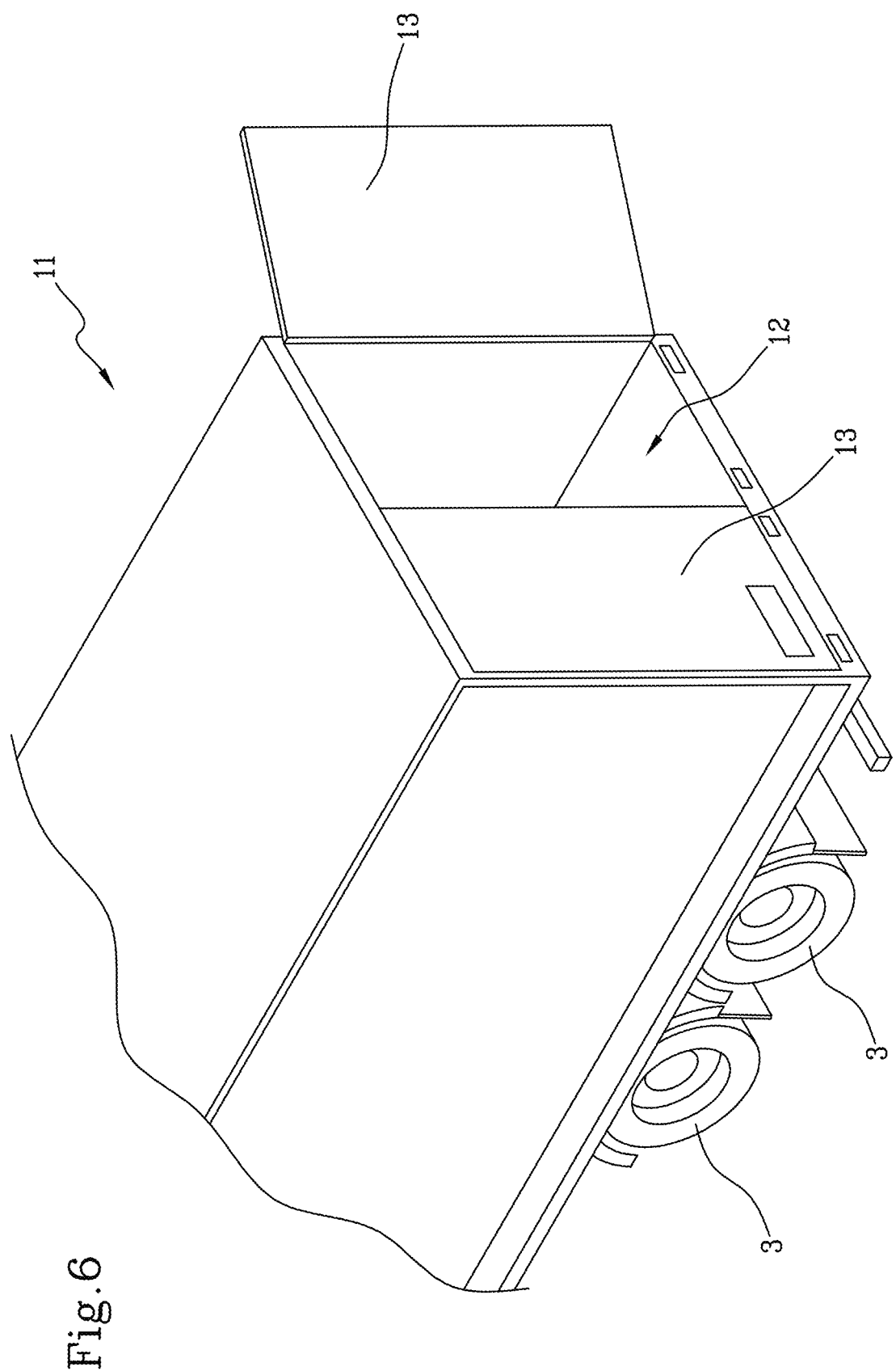

INDEPENDENT SUSPENSION

CROSS-REFERENCE TO RELATED APPLICATIONS

This application claims priority to Italian Patent Application 102023000002526 filed Feb. 15, 2023, the entirety of which is incorporated by reference herein.

BACKGROUND OF THE INVENTION

The present invention relates to an independent suspension for vehicles. Furthermore, the present invention relates to a vehicle for transporting people and/or materials.

The term vehicle is used to mean any type of vehicle, such as (according to a non-exhaustive list) buses, coaches, trucks, lorries, special vehicles and the like. In other words, the term vehicles can mean light, medium or heavy commercial vehicles. For example, the term vehicle refers to transport means suitable for transporting people or large volumes of material (loose or boxed) as well as for transporting luggage. In addition, the term vehicle can mean a vehicle provided with a low floor.

As known, the load floor of such vehicles is affected by the general structure of the vehicle chassis. In particular, it is known that when the vehicle is provided with classic axles, they generate a footprint that considerably reduces the volume of the load floor.

In the prior art, they are known axles of the independent type, i.e. structured in such a way as to allow each wheel on a same axis to move vertically (i.e. to react to a bump in the road) independently of the other, allowing the volume defined by the load floor to be increased, albeit slightly.

Nevertheless, existing solutions almost always have a central portion occupied by suspension or transmission elements, or if there is free space, it is not large enough to have a comfortable passage for material or people.

Therefore, the Applicant points out that this increase in volume is not sufficient and it may be difficult to be used by a user who intends to deposit materials inside the portion defined between the independent axles. In particular, the user should literally enter the load floor, dragging or pushing the material or luggage trying to fit it into the defined space between the two axles, resulting in a long time for the material (or luggage) to be loaded into the load floor. In other words, the known axles do not allow for sufficiently large volumes or are so small that, in order to reach them, an operator, specifically intended for loading luggage, would have to enter the load platform.

Furthermore, in the case of a vehicle provided with a tailgate for loading materials (as well as a tailgate or rear door for passenger access in buses), the bulkiness generated by known solutions makes it difficult and tiring for an operator to load materials.

Disadvantageously, the known solutions are therefore ineffective and do not allow to obtain sufficient space between the suspensions to adequately exploit the load floor.

The technical task of the present invention is thus to make available an independent suspension and vehicle capable of overcoming the drawbacks of the prior art.

The object of the present invention is therefore to provide an independent suspension and a vehicle that allow to increase the maximum load volume that can be transported by the vehicle, in particular without overhangs, facilitating the loading/unloading and handling of material both in terms of ergonomics and time.

A further object of the present invention is therefore to provide an independent suspension and a vehicle that allow to increase the low-floor area for passenger transit from the middle to the rear, and vice versa.

A further object of the present invention is therefore to provide an independent suspension and a vehicle that allow to have free space in the centre of the axle in the case of special vehicles that require space, for example for installing machinery, for an armoured body The specified technical task and the specified objects are substantially achieved by an independent suspension comprising the technical features set forth in one or more of the appended claims. The dependent claims correspond to possible embodiments of the invention.

BRIEF SUMMARY OF THE INVENTION

In particular, the specified technical task and specified objects are substantially achieved by an independent suspension for vehicles, in particular for transporting people and/or materials, comprising a hub defining a rotation axis of the wheel of the vehicle, an electric motor, operatively connected to the hub and configured to rotate the hub, and a support element operatively connected to the hub and developing, with a planar shape, along its own main development direction transverse to the rotation axis of the wheel. The support element is arranged below the hub and the electric motor.

The electric motor develops within a containment volume defined at least partially by the support element.

According to one aspect of the present invention, the support element at least partially defines a base of the containment volume.

According to one aspect of the present invention, the support element comprises a spring or absorber and a damper developing vertically relative to the support element.

According to one aspect of the present invention, the spring or absorber and/or the damper at least partially define an overall height of the containment volume.

Advantageously, the independent suspension allows to free up space within the vehicle by defining bulk-free auxiliary volumes both at the sides and at the top of the suspension components.

According to a further aspect of the present invention, the specified technical task and the specified objects are substantially achieved by a vehicle for transporting people and/or materials comprising an independent suspension according to one or more of the preceding claims for each wheel of the vehicle.

The independently coupled suspensions have a corridor defining a first auxiliary load volume and a second auxiliary load volume, located above the first auxiliary volume, having an extension greater than the extension of the first auxiliary volume.

Advantageously, the independent suspensions coupled to each other define a corridor that allows to increase the overall load volume of the vehicle so that more people and/or more materials can be transported.

Advantageously, the first auxiliary volume or the second auxiliary volume allow to increase the load for transporting batteries to be connected to the electric motor. In other words, the auxiliary volumes allow to transport a higher number of batteries or larger batteries than those that can be installed in the vehicles of the prior art.

Further characteristics and advantages of the present invention will become clearer from the indicative and therefore non-limiting description of an embodiment of an independent suspension and a vehicle.

BRIEF DESCRIPTION OF THE DRAWINGS

Such description will be set forth herein below with reference to the accompanying drawings, provided for merely indicative and therefore non-limiting purposes, wherein:

FIG. 6 is a schematic perspective view of the back of a vehicle for transporting people and/or materials.

DETAILED DESCRIPTION OF THE INVENTION

Figure 1:
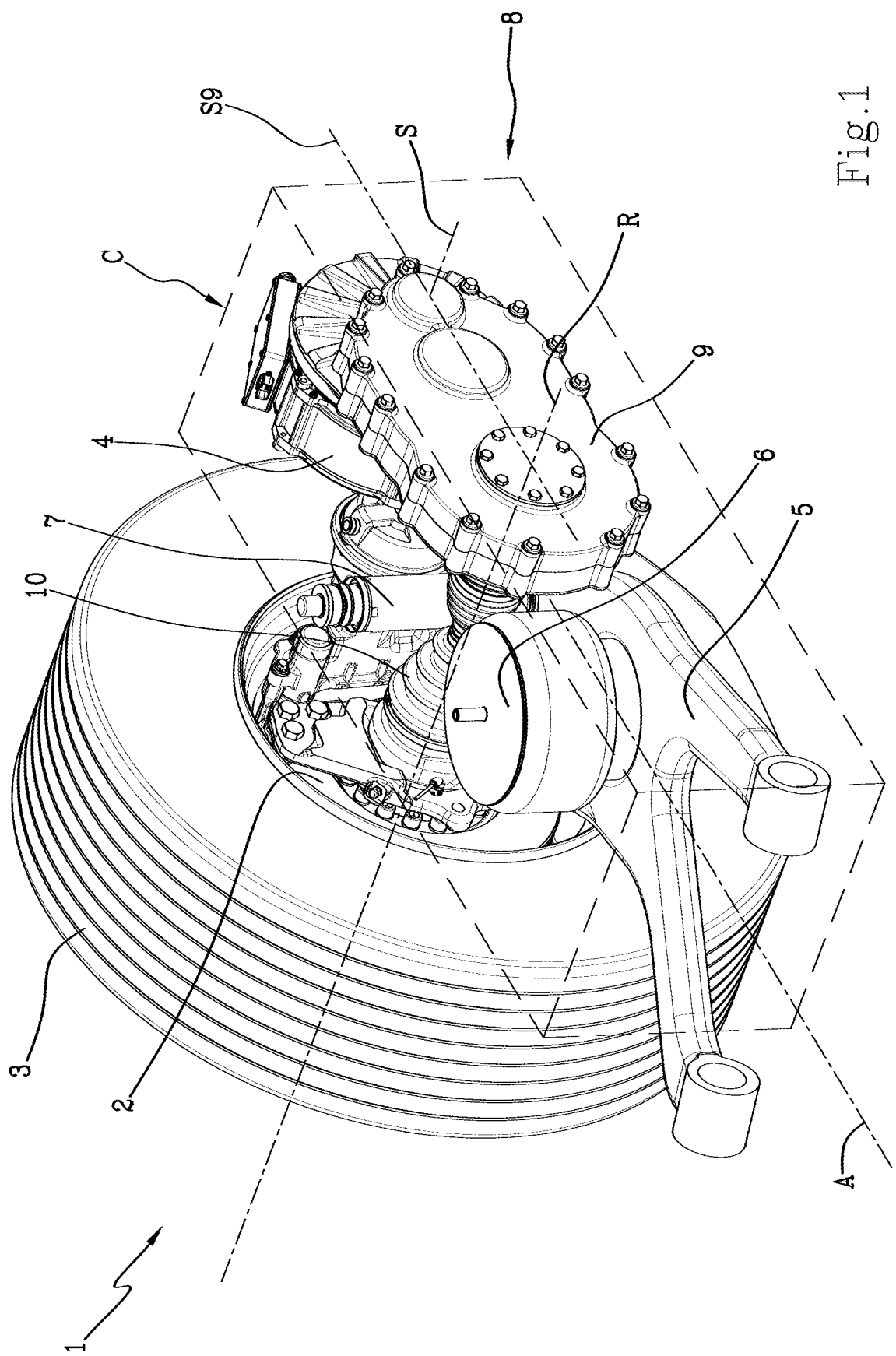
FIG. 1 is a schematic perspective view of an independent suspension object of the present invention.

With reference to the attached figures, 1 overall indicates an independent suspension for vehicles, in particular for transporting people and/or materials, which will be referred to as suspension 1 for ease of description.

The term "vehicle" means any type of vehicle, such as (according to a non-exhaustive list) buses, coaches, trucks, lorries, special vehicles and the like. In other words, the term vehicle can refer to light, medium or heavy commercial vehicles. For example, the term vehicle refers to transport means suitable for transporting people or large volumes of material (loose or boxed) as well as for transporting luggage. In addition, the term vehicle can mean a vehicle provided with a low floor.

The independent suspension 1 comprises a hub 2 defining a rotation axis "R" of a wheel 3 of the vehicle 11.

The independent suspension 1 further comprises an electric motor 4, operatively connected to the hub 2 and configured to rotate the hub 2.

Figure 2:
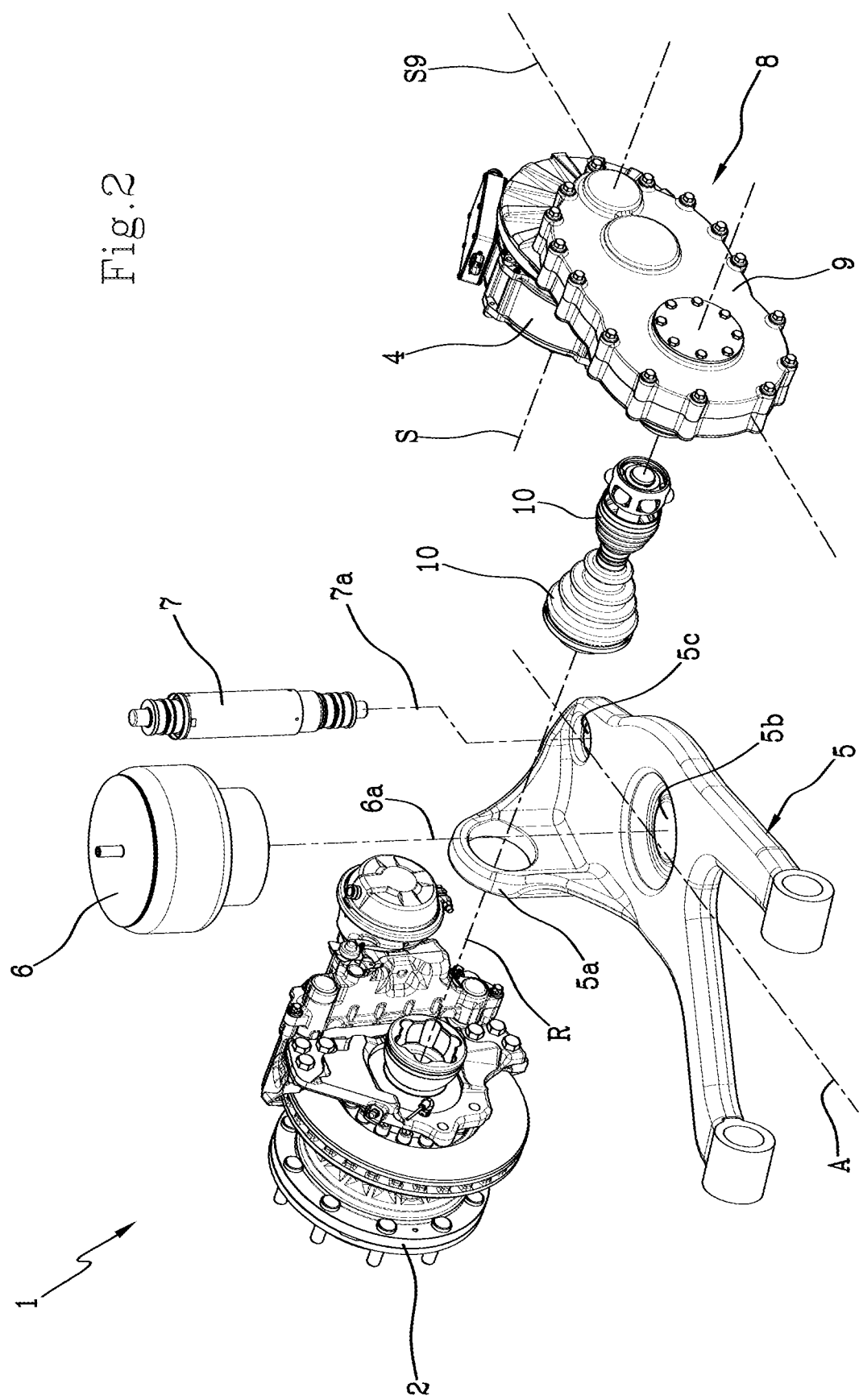
FIGS. 2, 3 and 4 are schematic exploded views of different embodiments of the independent suspension object of the present invention.
Figure 3:
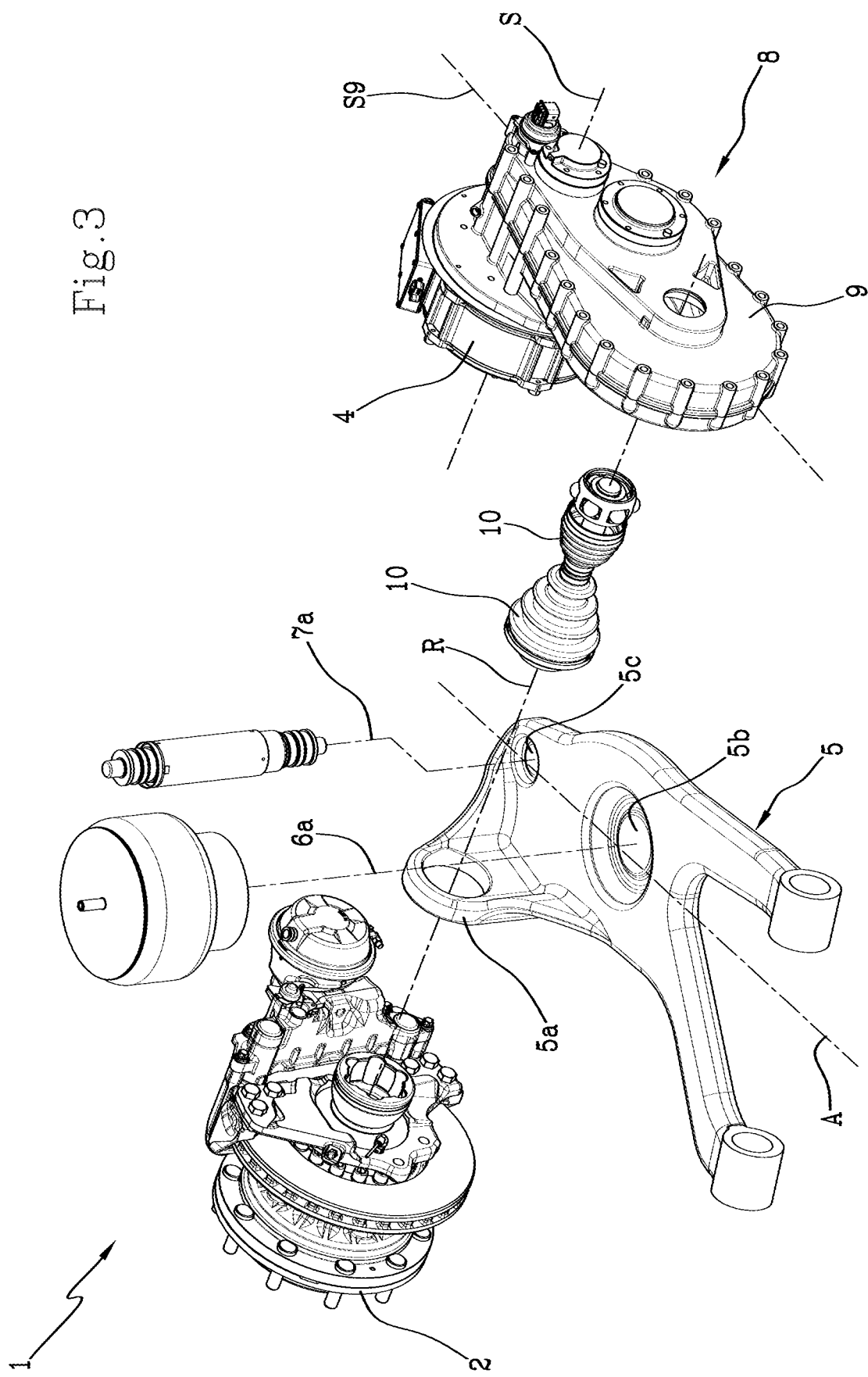

With reference to FIG. 1 and the embodiments in FIGS. 2 and 3, the electric motor 4 develops along its own development axis "S" parallel to the rotation axis "R" of the hub 2.

In such embodiments, the development axis "S" of the electric motor 4 and the rotation axis "R" of the hub 2 lie in the same horizontal plane.

In particular, in the embodiments of FIGS. 1 to 3, the electric motor 4 develops towards the hub 2. In other words, the electric motor 4 develops towards the wheel 3.

Figure 4:
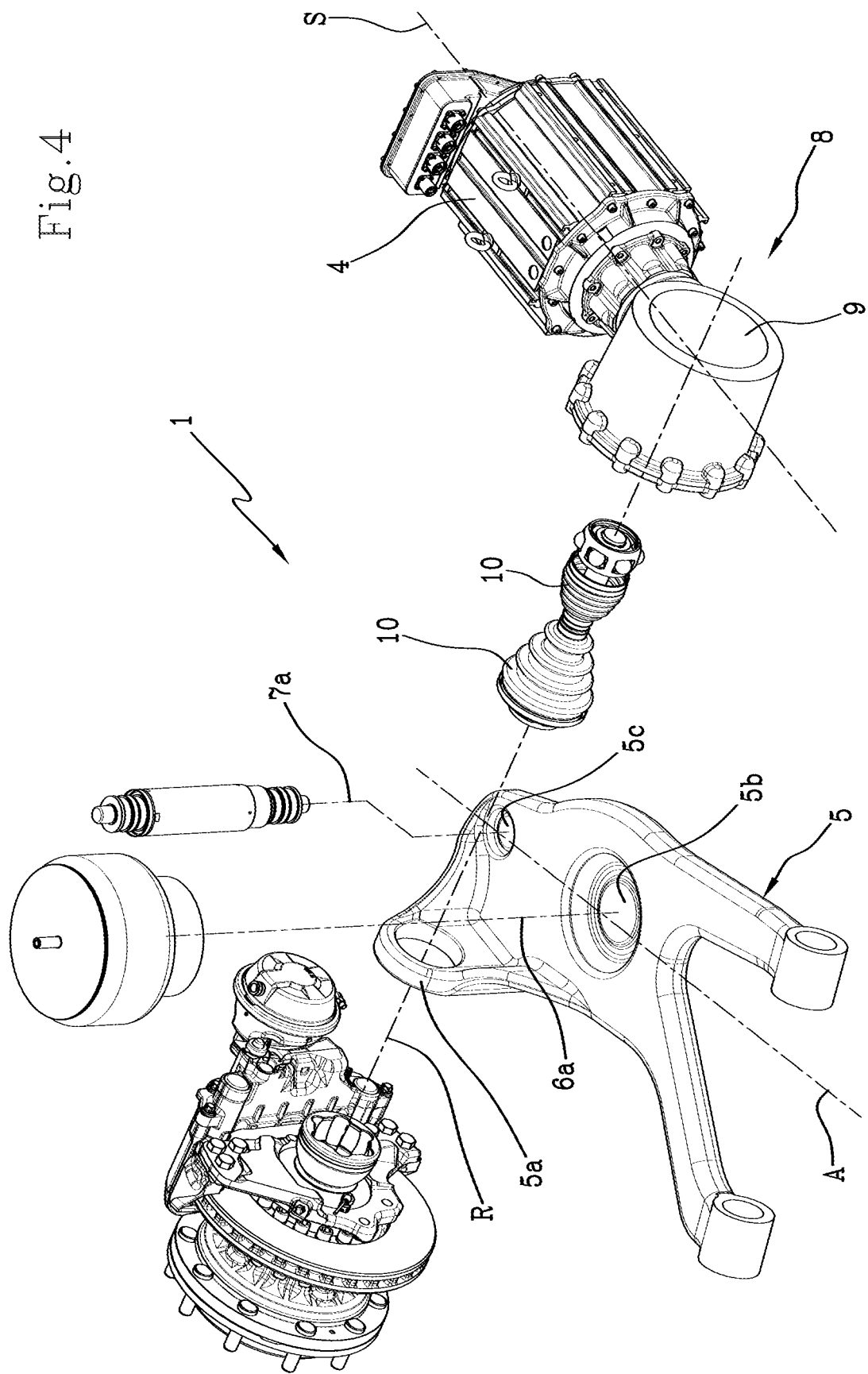
Figure 5:
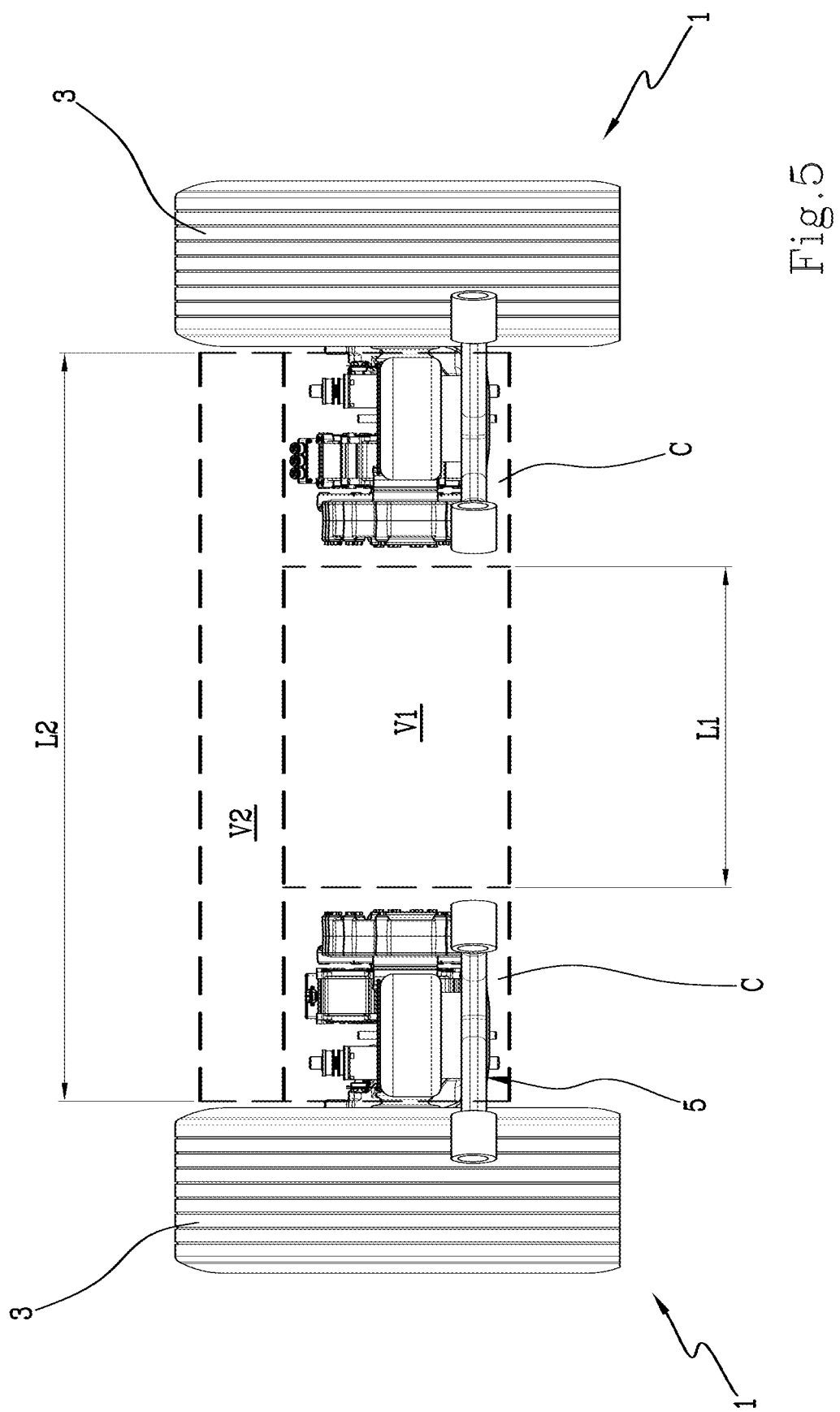
FIG. 5 is a schematic representation of a pair of independent suspensions object of the present invention.

With reference to the embodiment in FIG. 4, the electric motor 4 develops along its own development axis "S" transverse to the rotation axis "R" of the hub 2.

In particular, the development axis "S" of the electric motor 4 is transverse to the rotation axis "R" of the hub 2 with a tilt angle between 45° and 90°.

Preferably, the development axis "S" of the electric motor 4 is transverse to the rotation axis "R" of the hub 2 with a tilt angle between 70° and 90°.

Preferably, the development axis "S" of the electric motor 4 is transverse to the rotation axis "R" of the hub 2 with a tilt angle between 75° and 90°.

Preferably, the development axis "S" of the electric motor 4 is transverse to the rotation axis "R" of the hub 2 with a tilt angle between 85° and 90°.

In FIG. 4, the development axis "S" of the electric motor 4 is perpendicular to the rotation axis "R" of the hub 2.

In the embodiments wherein the electric motor 4 is not perpendicular to the rotation axis "R" of the hub 2, it is recessed relative to the main structure and in particular it develops towards the hub 2 or the wheel 3.

In this embodiment, the development axis "S" of the electric motor 4 and the rotation axis "R" of the hub 2 lie in the same horizontal plane.

The independent suspension 1 also comprises a support element 5 operatively connected to the hub 2 and developing, with a planar shape, along its own main development direction "A" transverse to the rotation axis "R" of the wheel 3.

The support element 5 is arranged below the hub 2 and the electric motor 4.

Preferably, the support element 5 comprises a hinge point 5a substantially horizontal relative to the hub 2. In other words, the hinge point 5a defines a direct connection between the hub 2 and the support element 5. In one embodiment, as shown in FIGS. 1-4, there is only a single support element 5 operatively connected to the hub 2 to support the hub 2 and there is only a single hinge point 5a, aligned with the rotation axis R.

Preferably, the hinge point 5a is defined by a pin rigidly constrained to the hub 2 and rotatably coupled, by means of bearings or slides, with the hub 2.

Preferably, the support element 5 defines a transverse arm.

Preferably, the support element 5 comprises a spring 6 or absorber and a damper 7 developing vertically relative to the support element 5.

In other words, the support element 5 has two seats 5b and 5c respectively intended for connecting the support element 5 with the spring 6 (or absorber) and the damper 7.

In addition, the spring 6 and the damper 7 develop along their respective development axes 6a and 7a.

The electric motor 4 develops within a containment volume "C" defined at least partially by the support element 5.

The containment volume "C" means a volume within which most of the components defining the independent suspension 1 are contained.

In this context, the containment volume "C" is defined at the bottom by the support element 5. In other words, the support element 5 defines a base of the containment volume "C".

Advantageously, such a configuration allows to obtain a compact independent suspension 1 adapted to obtain additional space (i.e. additional volume) whereby more people or materials (or luggage) can be loaded onto the vehicle 11, or for different use in special vehicles.

Preferably, the spring 6 and/or damper 7 define a height of the containment volume "C". Still more preferably, the spring 6 and/or damper 7 define a maximum height of the containment volume "C".

In other words, the containment volume "C" contains at least the support element 5 (which defines its base), the spring 6 and the damper 7 (at least one of which defines the height of the containment volume "C") and the electric motor 4, which will therefore be contained in a portion of the containment volume "C" between the support element 5 and the maximum height of the containment volume "C".

As represented for example in the enclosed figures, the independent suspension 1 further comprises a transmission system 8, to rotate the hub 2 of the wheel 3 via the electric motor 4, comprising a speed reducer 9, an input shaft between the electric motor 4 and the speed reducer 9 and an output shaft between the speed reducer 9 and the hub 2.

Preferably, the output shaft is connected to the hub 2 and the speed reducer 9 via respective joining elements 10 made in the form of constant-velocity joints. The term constant-velocity joints refers to joints capable of maintaining a constant transmission ratio between the input shaft and output shaft.

Preferably, the speed reducer 9 defines a side wall of the containment volume "C" and the hub 2 defines a side wall opposite to the side wall defined by the speed reducer 9.

In the embodiment of FIGS. 2 and 3, wherein the electric motor 4 develops along the development axis "S" parallel to the rotation axis "R" of the hub 2, the speed reducer 9 develops along its own development axis "S9" perpendicular to the rotation axes "R" and development axes "S".

Preferably, at least the input shaft and the speed reducer 9 are provided with bevel gears meshed to each other.

Alternatively, at least the input shaft and the speed reducer 9 create a transmission of motion by means of transmission belts.

Preferably, the transmission system 8 is of the single-speed type, such as the embodiment in FIG. 2 (as described above).

Preferably, the transmission system 8 is of the multi-speed type, such as the embodiment in FIG. 3. In other words, the previously described components for the transmission system 8 can be modified according to whether a multi-speed transmission system is desired.

In the embodiment shown in FIG. 4, wherein the electric motor 4 develops along its own development axis "S" perpendicular to the rotation axis "R" of the hub 2, the input shaft and the speed reducer 9 are provided with respective bevel gears which are meshed to each other. In other words, the input shaft is the drive shaft of the electric motor 4 (or is an additional shaft connected or connectable to the drive shaft) and is provided with a bevel gear meshed to a bevel gear of the speed reducer 9. The development axis of the input shaft coincides with the development axis "S" of the electric motor 4.

Preferably, and as depicted in the enclosed figures for all the embodiments of the present invention, the development axis "S" of the electric motor 4 and the rotation axis "R" of the hub 2 lie in the same plane parallel to the support element 5.

Alternatively, the development axis "S" and the rotation axis "R" can lie in a lying plane transverse to the support element 5. In particular, the transverse lying plane of the development axis "S" and the rotation axis "R" is inclined relative to the support element 5 in such a way that the electric motor 4 remains contained within the containment volume "C".

Advantageously and as noted above, the independent suspension 1 object of the present invention is able to overcome the drawbacks of the prior art.

Advantageously, the independent suspension 1 has a compact structure adapted to obtain additional volume within a load floor of a vehicle, particularly a low-floor vehicle.

Furthermore, the solutions described above are particularly versatile, resulting in a structure that can be adapted according to the construction requirements of the vehicle concerned.

Advantageously, the independent suspension 1 also results in a simplified structure that is easy to assemble/disassemble and whose maintenance is not, therefore, particularly difficult.

Advantageously, the containment volume "C" allows to obtain a corridor (i.e., the space between two suspensions coupled along the same "axis") greater than that obtainable from known independent axles where the axis of the electric motor tends to coincide with the rotation axis of the hub (in other words, those known axles wherein the electric motor occupies the space that is instead obtained with the present invention) and/or where the rest of the components occupy vertical space.

In other words, by means of the present invention, a containment volume "C" occupied by the components of the independent suspension is defined, allowing for a first auxiliary volume "V1" and a second auxiliary volume "V2" defined above the first auxiliary volume "V1" i.e., above the containment volume "C".

The present invention also relates to a vehicle 11 for loading people and/or materials comprising an independent suspension 1 (according to one or more of the embodiments described above) for each wheel 3 of the vehicle 11.

In other words, if the vehicle 11 has, for example, eight wheels (i.e. four pairs of wheels 3), it will also be provided with eight independent axles 1 as the ones described above.

The independent suspensions 1 are coupled together having a corridor so as to define a first auxiliary load volume "V1" and a second auxiliary load volume "V2", located above the first auxiliary load volume "V1", having an extension "L2" greater than an extension "L1" of the first auxiliary load volume "V1".

In other words, the distance between two coupled wheels 3 obtained by the use of the independent suspension 1 previously described allows to obtain a greater volume than would normally be the case with the known solutions in which the same would be absent or so small as to be neither usable nor easy-to-reach. This solution is particularly advantageous for heavy vehicles 11 provided with a low floor.

Preferably, the vehicle 11 further comprises a load platform 12 for loading luggage or other materials having a main load volume and a number of first "V1" and second auxiliary load volumes "V2" equal to the number of pairs of independent suspensions 1 present in the vehicle 11.

Preferably, the vehicle 11 further comprises a plane configured for supporting passengers that is provided, near the independent suspension 1, with a lying width substantially equal to a width (i.e. the extension "L2") of the second auxiliary volume "V2".

Preferably, the vehicle 11 further comprises a tailgate 13 for loading people and/or materials. In other words, the vehicle 11 allows access and transit in a rear area while maintaining the low floor lowered without the need for level changes.

Advantageously, the vehicle 11 described above has a low floor provided with a greater usable volume than known heavy vehicles. In other words, the vehicle 11 described above allows to transport a greater load than the vehicles of the known type.

In addition, the vehicle 11 described above allows to transport a greater number of people and/or luggage (in the case of buses, for example) and therefore more materials (in the case of goods trucks and the like).

Advantageously, the present invention provides an independent suspension and a vehicle that allow to increase the maximum load the vehicle can carry.

Advantageously, the present invention provides an independent suspension and a vehicle that allow to increase the actual surface on which a passenger or other user can walk.

Advantageously, the independent suspension can be used for smaller wheels (such as those of a car or small vehicle) or for larger wheels (such as buses or the like).

Advantageously, the independent suspension allows to increase the free space of the central body of vehicles such as logistics or special vehicles.

Advantageously, the present invention is applicable to any suspension having a structural scheme different from the one shown in the accompanying figures.

The invention claimed is:

1. An independent suspension for a vehicle, comprising:
a hub defining a rotation axis of a wheel of the vehicle;
an electric motor, operatively connected to the hub and configured to rotate the hub;
only a single support element operatively connected to the hub to support the hub, the support element having a frame side portion having a pivot axis upon which the support element pivots with respect to the frame and a hub side portion connected to the hub, thereby establishing a main development direction of the support element between the frame side portion and the hub side portion, the main development direction being transverse to the rotation axis of the wheel, the support element extending along the main development direction, wherein said pivot axis is positioned radially, with respect to the rotation axis of the wheel, beyond a radial extent of a tire mounted to the wheel and wherein the support element is substantially arranged at a lower vertical level than said rotation axis of the wheel and said electric motor and substantially forward of, or rearward of, the hub,
wherein said hub side portion comprises only a single hinge point, aligned with the rotation axis of the wheel,
wherein said electric motor extends within a containment volume defined at least partially by said support element, and
wherein said support element comprises a spring or absorber and a damper developing vertically relative to said support element, said spring or absorber and/or said damper defining a height of said containment volume, wherein said support element also comprises a generally planar portion extending along the main development direction and configured to connect to the spring or absorber and the damper.

2. The independent suspension according to claim 1, wherein said support element defines a transverse arm.

3. The independent suspension according to claim 1, further comprising a transmission system, configured to rotate the hub of the wheel by said electric motor, comprising a speed reducer, an input shaft between the electric motor and the speed reducer and an output shaft between the speed reducer and the hub, wherein said speed reducer defines a side wall of said containment volume.

4. The independent suspension according to claim 3, wherein said output shaft is connected to said hub and to said speed reducer by respective joining elements, the respective joining elements being constant-velocity joints.

5. The independent suspension according to claim 3, wherein said electric motor extends along a first development axis thereof parallel to said rotation axis of the hub and wherein the electric motor extends towards said hub.

6. The independent suspension according to claim 5, wherein said speed reducer extends along a second development axis thereof perpendicular to said rotation axis and said first development axis.

7. The independent suspension according to claim 3, wherein at least said input shaft and said speed reducer include bevel gears meshed to each other or are drivingly connected to each other by transmission belts.

8. The independent suspension according to claim 3, wherein said transmission system is a single-speed transmission or a multiple-speed transmission.

9. The independent suspension according to claim 1, wherein said electric motor extends along a first development axis thereof transverse to said rotation axis of the hub.

10. The independent suspension according to claim 9, wherein said first development axis of the electric motor is perpendicular to said rotation axis of the hub.

11. The independent suspension according to claim 3, wherein said input shaft and said speed reducer include respective bevel gears meshed to each other.

12. The independent suspension according to claim 5, wherein said first development axis and said rotation axis lie in a same plane parallel to said support element.

13. A vehicle for transporting people and/or materials comprising the independent suspension according to claim 1 for each wheel of the vehicle, said independent suspensions coupled together and having a corridor defining a first auxiliary load volume and a second auxiliary load volume positioned above the first auxiliary load volume and having an extension greater than an extension of the first auxiliary load volume.

14. The vehicle according to claim 13, and further comprising a load platform for loading luggage or other materials, the load platform including a main load volume and a number of first and second auxiliary load volumes equal to a number of independent suspension pairs present in the vehicle.

15. The vehicle according to claim 13, and further comprising a plane configured for supporting passengers that includes, near said independent suspension, a lying width substantially equal to a width or extension of the second auxiliary load volume.

16. The vehicle according to claim 13, and further comprising a tailgate for loading people and/or materials.

17. The independent suspension according to claim 3, wherein said speed reducer extends along a second development axis thereof perpendicular to said rotation axis and said first development axis.

18. The independent suspension according to claim 1, wherein said electric motor extends along a first development axis thereof parallel to said rotation axis of the hub and wherein the electric motor extends towards said hub.

* * * * *